United States Patent
Salameh

(10) Patent No.: US 9,694,967 B2
(45) Date of Patent: Jul. 4, 2017

(54) MOUNTING CUP AND COLLAR ASSEMBLY FOR PLASTICS AEROSOL CONTAINER

(71) Applicant: PETAPAK IP LIMITED, Geroge Town, Grand Cayman (KY)

(72) Inventor: Asim Salameh, Selangor Darul Ehsan (MY)

(73) Assignee: PETAPAK IP LIMITED, George Town (KY)

( * ) Notice: Subject to any disclaimer, the term of this patent is extended or adjusted under 35 U.S.C. 154(b) by 0 days.

(21) Appl. No.: 14/653,935

(22) PCT Filed: Dec. 6, 2013

(86) PCT No.: PCT/MY2013/000263
§ 371 (c)(1),
(2) Date: Jun. 19, 2015

(87) PCT Pub. No.: WO2014/104870
PCT Pub. Date: Jul. 3, 2014

(65) Prior Publication Data
US 2015/0329273 A1    Nov. 19, 2015

(30) Foreign Application Priority Data
Dec. 24, 2012    (MY) ................. 2012005592

(51) Int. Cl.
*B65D 83/38*    (2006.01)
*B65D 83/40*    (2006.01)
(Continued)

(52) U.S. Cl.
CPC .............. *B65D 83/38* (2013.01); *B29C 49/08* (2013.01); *B65D 83/40* (2013.01);
(Continued)

(58) Field of Classification Search
CPC . B65D 83/38; B65D 83/40; B21J 9/06; B29C 49/08; Y10T 29/4992; B29L 2031/712; B29K 2067/003
(Continued)

(56) References Cited

U.S. PATENT DOCUMENTS 4,795,045 A * 1/1989 Radtke ................... B65D 83/38
                                                   215/325
5,954,224 A * 9/1999 Berger ................. B65D 1/0207
                                                   215/382
(Continued)

FOREIGN PATENT DOCUMENTS

WO    2012066307 A2    5/2012

OTHER PUBLICATIONS

International Search Report for PCT/MY2013/000263 of May 14, 2014.

*Primary Examiner* — Donnell Long
(74) *Attorney, Agent, or Firm* — Pearne & Gordon LLP

(57) ABSTRACT

A container for dispensing an aerosol product. The container (1) includes a body (2) formed of plastics material such as PET, and a mounting cup and collar assembly (53). The body (2) includes a neck (10) defining an opening (50) having internal and external walls (51 and 52), respectively. The mounting cup and collar assembly (53) is formed of malleable material, and is shaped to straddle the internal and external walls (51 and 52) of the opening (50), and be crimped to the external wall (52) of the neck (10). The mounting cup and collar assembly (53) is preferably of unitary construction, and, includes a lining (60) on its inner surface to assist in providing a seal between the components.

11 Claims, 15 Drawing Sheets

(51) Int. Cl.
*B29C 49/08* (2006.01)
*B29K 67/00* (2006.01)
*B29L 31/00* (2006.01)

(52) U.S. Cl.
CPC ... *B29K 2067/003* (2013.01); *B29L 2031/712* (2013.01); *Y10T 29/4992* (2015.01)

(58) Field of Classification Search
USPC .......................................... 222/402.1; 29/511
See application file for complete search history.

(56) References Cited

U.S. PATENT DOCUMENTS

| | | | |
|---|---|---|---|
| 6,390,326 B1 | 5/2002 | Hung | |
| 7,721,920 B2 | 5/2010 | Ruiz De Gopegui et al. | |
| 8,025,189 B2 | 9/2011 | Salameh | |
| 2005/0127022 A1* | 6/2005 | Flashinski | B65D 83/38 215/40 |
| 2006/0073298 A1* | 4/2006 | Hutchinson | B29C 44/04 428/36.91 |
| 2006/0255049 A1* | 11/2006 | McCarthy | A47G 19/2205 220/703 |
| 2007/0125809 A1* | 6/2007 | Regan | B65D 83/64 222/389 |
| 2012/0241457 A1* | 9/2012 | Hallman | B65D 83/38 220/309.1 |

* cited by examiner

MOUNTING CUP AND COLLAR ASSEMBLY FOR PLASTICS AEROSOL CONTAINER

This application is a National Stage application of PCT international application PCT/MY2013/000263, filed on Dec. 6, 2013 which claims the priority of Malaysian Patent Application No. 2012005592 entitled "MOUNTING CUP AND COLLAR ASSEMBLY FOR PLASTICS AEROSOL CONTAINER", filed with the Malaysian Patent Office on Dec. 12, 2012, both of which are incorporated herein by reference in their entirety.

BACKGROUND OF THE INVENTION

The present invention relates to an aerosol container, and in particular, a container for dispensing a pressurised product which is formed of PET or like plastics material. The present invention also relates, in particular, to a mounting cup and collar assembly for such a container, and, to methods of manufacturing the container and the mounting cup and collar assembly therefor.

DESCRIPTION OF THE PRIOR ART

The reference to any prior art in this specification is not, and should not be taken as, an acknowledgement or any form of suggestion that that prior art forms part of the common general knowledge.

The Applicant has previously invented and developed various aerosol containers, manufactured of PET and like plastics material, which overcome a number of deficiencies and provide significant improvements over the then prior art. This includes the Applicant's earlier International Patent Application Nos. PCT/AU2005/001474 and PCT/AU2006/00614, which have evolved into various National/Regional Patents, including U.S. Pat. No. 8,025,189.

These earlier inventions relate to a container, which includes a body of plastics material, to which a collar is attached thereto, to support a dispensing valve. The collar is provided, at least in part, to straddle the internal and external walls of the container, so as to provide structural integrity to the neck of the container and thereby facilitate securement of the dispensing valve components thereto. Whilst this arrangement provides significant improvements, which facilitates the use of plastic PET type containers rather than traditional metal containers for the supply of pressurised/aerosol products, they primarily sought to conform with the then traditional manufacturing, assembly and filling operations which existed at the time, whilst enabling a transition to the use of more environmentally friendly PET plastics materials for the supply of aerosol products. Plastics containers require careful considerations over metal containers, to provide a safe container capable of withstanding the relatively high pressures provided within such containers without cracking, leaking etc.

In the Applicant's earlier product, as described in the aforementioned Patent Applications, the body was typically stretch blow moulded from polyethylene terephthalate (PET) or like plastics material, and had a shaped neck surrounding an opening. The collar was also injection moulded and was shaped to be snap-fitted or screwed to the shaped neck of the body about the opening.

Whilst the Applicant's earlier Patent application provided significant advantages over the prior art, the Applicant has now identified alternative versions of the PET aerosol container which has differences from the Applicant's earlier products and processes, and, which provides enhanced benefits thereover.

The Applicant has invented significant improvements in relation to the maintaining attachment of the collar to the container during the manufacturing process, and, has achieved a design which has comparable characteristics to prior art metal and aluminum containers, whilst having the advantages of using PET type plastics.

SUMMARY OF THE INVENTION

The present invention seeks to provide a container for dispensing an aerosol product, and in particular, a mounting cup and collar assembly therefor, which overcomes at least some of the disadvantages of the prior art.

The present invention also seeks to provide a container and a mounting cup and collar assembly therefor which has manufacturing and/or assembly line advantages over known methods.

In one broad form, the present invention provides a container for dispensing an aerosol product, including:
 a body, formed of plastics material such as PET, including
  a neck defining an opening having internal and external walls; and,
 a mounting cup and collar assembly, formed of malleable material, which is shaped to straddle the internal and external walls of said opening, and be secured to said external wall of said neck.

Preferably, said mounting cup and collar assembly includes a skirt depending therefrom which is adapted to be secured to the external wall of said neck.

Also preferably, said mounting cup and collar assembly is of unitary construction.

Preferably said mounting cup and collar assembly is secured to said external wall of said neck by being crimped thereto.

Also preferably said assembly is formed of tin, aluminium or other metal and includes a lining of plastic, PE, PP, or like material.

Preferably, said external wall includes at least one groove or undercut for securement of said assembly thereto.

Also preferably said assembly is crimped or otherwise shaped to form at least one swaged ring for engagement with a correspondingly shaped groove or indentation in said external wall of said neck.

Preferably, an end portion of said assembly is crimped or shaped to engage a correspondingly shaped undercut in said external wall of said neck.

Also preferably, said external wall of said neck further includes at least one crush rib which is adapted to provide a seal between said assembly to said body.

In a further broad form, the present invention provides a mounting cup and collar assembly formed of malleable material, which is adapted to be secured to a container for dispensing an aerosol product, the container being formed of plastics material such as PET and including a shaped neck defining an opening having internal and external walls, the assembly being shaped to straddle the internal and external walls of the opening and be secured to the external wall of said neck of said container.

Preferably, the assembly further includes a skirt depending therefrom which is adapted to be secured to the external wall of said neck.

Also preferably said assembly is of unitary construction.

Preferably said assembly is secured to said container by being crimped thereto.

Also preferably, said assembly is formed of tin, aluminium or other metal material and includes a lining of plastic PE, PP, or like on an inner surface thereof.

Preferably, said assembly is adapted to be secured to at least one groove or undercut provided in said container.

Also preferably, said assembly is crimped or otherwise shaped to form at least one swaged ring for engagement with a correspondingly shaped surface in said external wall of said neck.

Preferably, said assembly is crimped or otherwise shaped to engage a correspondingly shaped undercut in said external wall of said neck.

Also preferably, said assembly is adapted to sealingly engage with at least one crush rib provided on the external wall of said neck.

In a further broad form, the present invention provides a method of forming a container for dispensing an aerosol product, including the steps of:
forming a container body, or preform, including a neck defining an opening;
inserting a mounting cup and collar assembly over said neck such that it straddles internal and external walls of said opening; and,
securing said assembly to the external wall of said neck.

Preferably, said securing step includes crimping said assembly to the external wall of said neck.

Also preferably, said mounting cup and collar assembly is of unitary construction.

Preferably, said mounting cup and collar assembly includes a lining of plastics PE, PP, or like material.

Also preferably, in said securing step at least one swaged ring on said assembly engages a correspondingly shaped groove or indentation provided in said external wall of said container.

Preferably, in said securing step, an end portion of said assembly is crimped or otherwise engaged with a correspondingly shaped undercut provided in said external wall of said neck.

Also preferably, in said securing step, said assembly is adapted to engage with at least one crush rib formed on said external wall.

Also preferably, when said preform is used in said forming step, said method further includes the step of stretch blowmoulding said preform to form said container.

BRIEF DESCRIPTION OF THE DRAWINGS

The present invention will become more fully understood from the following detailed description of preferred but non-limiting embodiments thereof, described in connection with the accompanying drawings, wherein.

DETAILED DESCRIPTION OF PREFERRED EMBODIMENT

Figure 1:
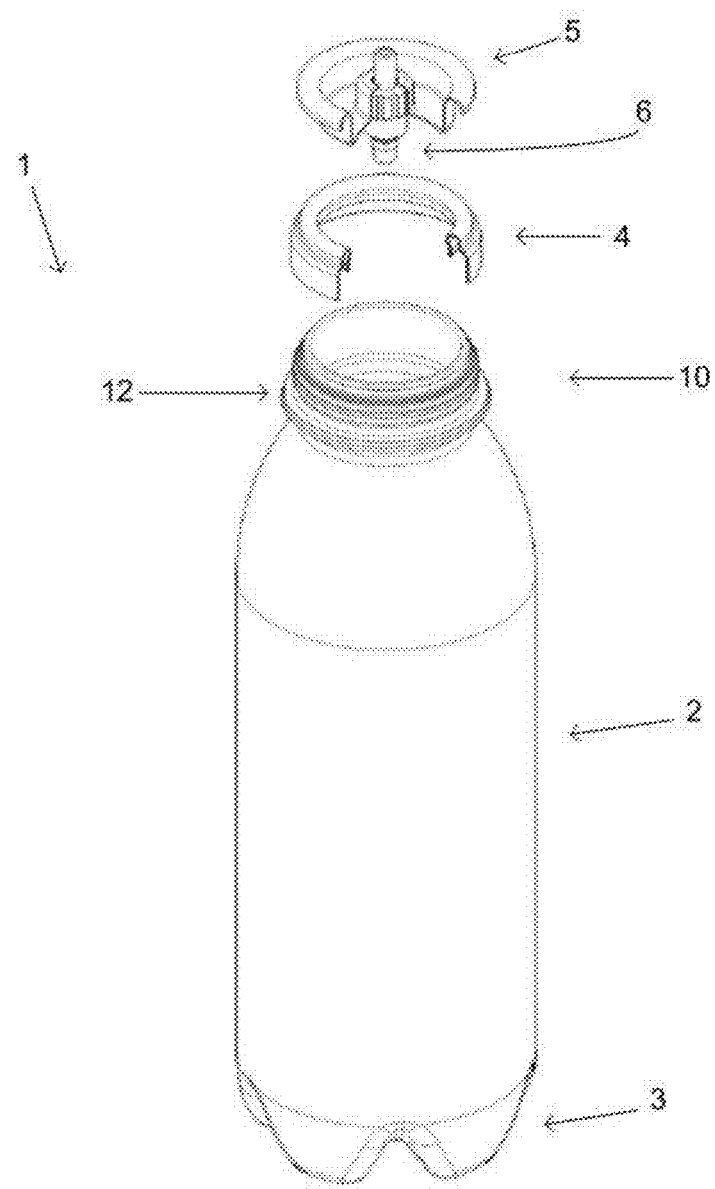
FIG. 1 shows an exploded perspective view, partly cut-away, of a container with the collar, mounting cup and dispensing valve, fitted thereon, in accordance with a preferred embodiment of the present invention.

Throughout the drawings, like numerals will be used to identify similar features, except where expressly otherwise indicated.

The present invention relates to a container for dispensing a pressurised or aerosol product wherein the container (1) includes a body portion (2), a collar (4), a mounting cup (5) and a dispensing valve (6). The body portion (2) includes a base (3) at a first end thereof, and a neck portion (10) at a second end thereof. The neck portion (10) further preferably includes one or more ribs (12).

Figure 2:
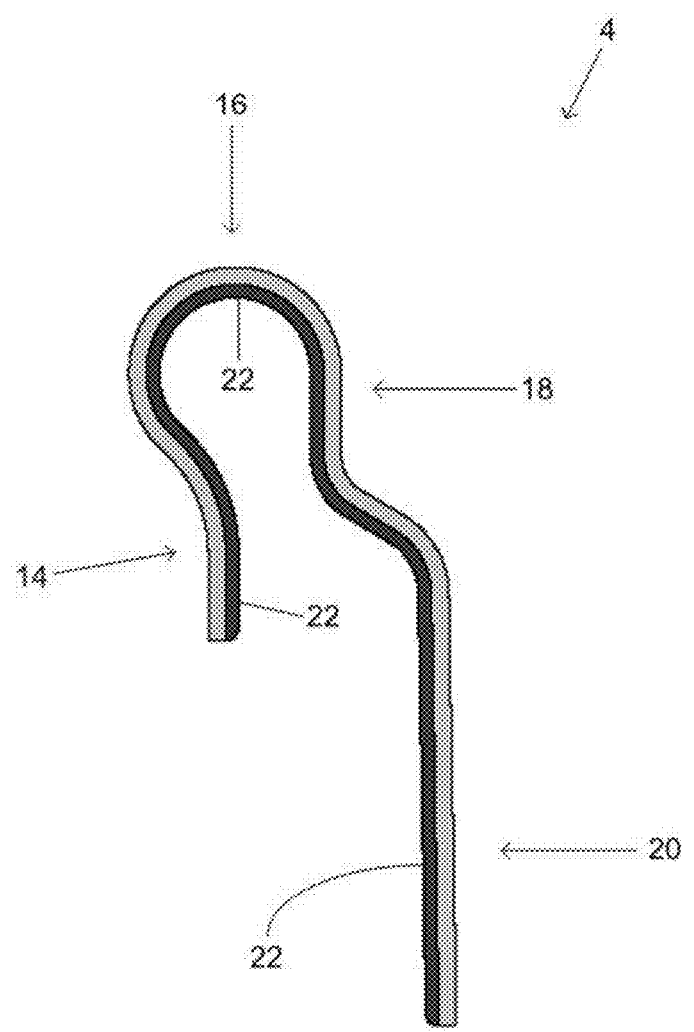
FIG. 2 shows an enlarged cross-sectional view of the collar before being crimped to the neck.

For the purpose of explanation, the collar (4) may be divided into a first, second, third and fourth sections, labelled 14, 16, 18 and 20, respectively, as shown in FIG. 2.

As illustrated in FIG. 2, the inner surface (22) of the collar (4) is preferably provided with a plastic, rubber, polyethylene (PE), polypropylene (PP), or like coating to assist creating a seal between the collar (4) and the neck portion (10) of the container (1), when assembled.

Figure 3:
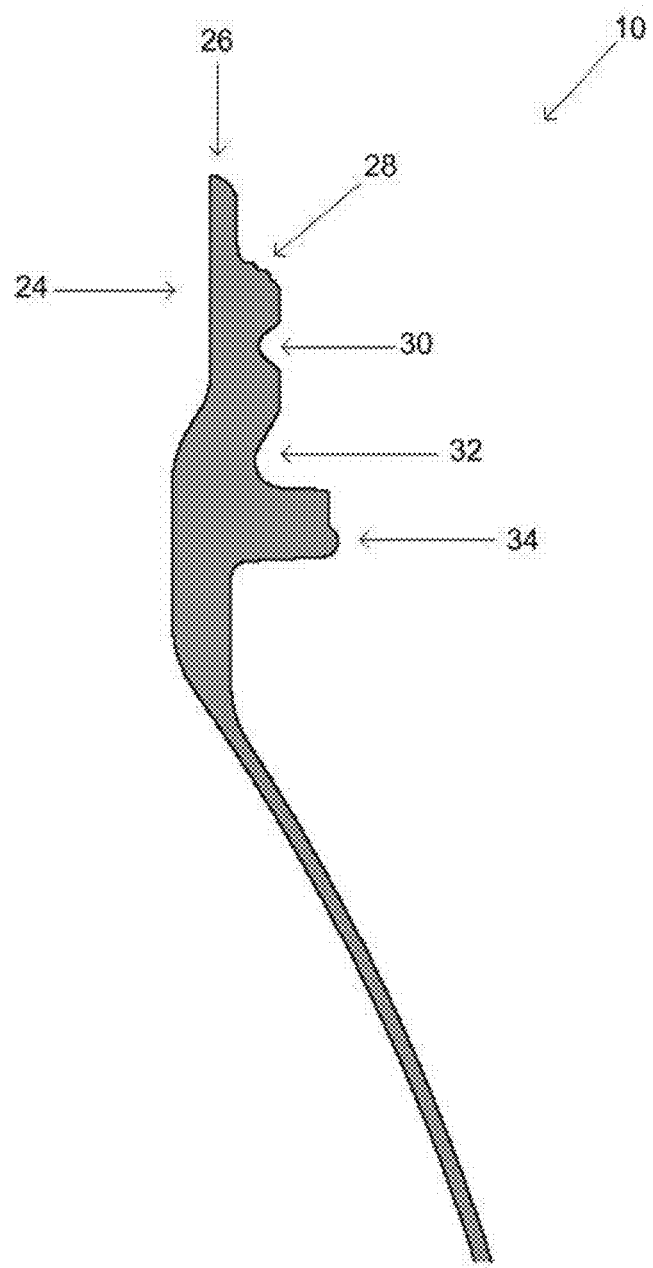
FIG. 3 shows an enlarged cross-sectional view of a neck portion of the container of FIG. 1.

As illustrated in FIG. 3, and also to assist in explanation, the neck portion (10) of the container (1) may be divided into a first, second, third, fourth, fifth and six sections, labelled 24, 26, 28, 30, 32 and 34, respectively. When the collar (4) is attached onto the neck portion (10) such as, by crimping, the lining (22) provided on the inner surface of the collar (4) seals against the neck (10).

Figure 4:
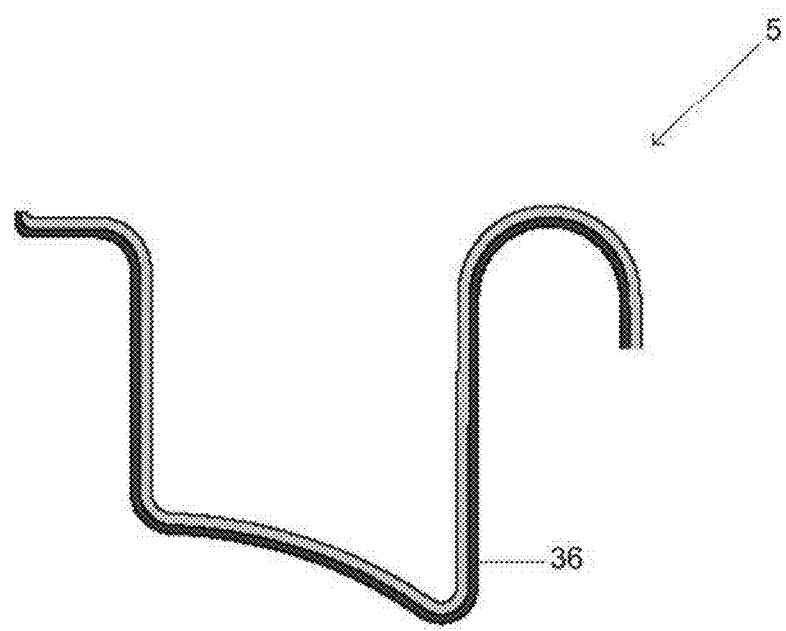
FIG. 4 shoes an enlarged cross-sectional view of the mounting cup.

A mounting cup (5), such as shown in FIG. 4 may also be provided with a plastic coating (36) on it's inner surface to seal with the other components of the container (1), when assembled. This coating may be of PP, PE or other suitable material.

The crimping process of this embodiment of the invention may be performed both externally and internally relative to the collar and the neck portion of the container. The external crimping process would crimp respective sections of the collar to respective sections of the neck portion. The internal crimping process would crimp the dispensing valve mounting cup against section of the collar and also crimp it against respective sections of the neck portion.

The container (1), as shown in FIG. 1 is preferably formed of plastics material such as PET. The body (2), including its base (3) and neck portion (10) are preferably integrally formed by stretch blow moulding plastics material, such as a polyethylene terephthalate (PET) from a preform, as described in the Applicant's earlier aforementioned Patent specifications. The neck portion (10) may include one or more ribs (12).

The improvement according to this embodiment of the invention is primarily in relation to the collar (4) and the neck portion (10). The collar (4) according to the present invention is made of metal, such as tin or aluminum or the like materials.

This embodiment of the collar (4) of the present invention is of different shape to the collar illustrated in the Applicant's aforementioned Patent. The assembly of the collar (4), and thereafter the dispensing valve (6), onto the container is perhaps best illustrated in FIGS. 5 to 8, but with reference to FIGS. 2 to 4.

The first section (14) of the collar (4) is shaped such that the mounting cup (5) with dispensing valve (6) attached may be crimped thereto, to thereafter ensure that the various components are not separated from each other when the container is in use. A second section (16) of the collar (4) is shaped and configured to fit the dispensing valve mounting cup (5). A third section (18) of the collar (4) is a section extending from the second section (16) towards a fourth section (20) as shown in FIG. 2.

The fourth section (20) of the collar (4) is basically an elongated section or skirt which actually extends beyond the length of the first section (14). Reference is again made to FIG. 2 wherein the inner surface 22 is shown to be provided with a plastic coating. According to the present invention, the said plastic coating (22) is preferably designed to be between around 200 to 300 microns in size. This plastic coating (22) may be applied when manufacturing the collar (4) using known methods. The plastic coating (22) is provided to create a seal between the collar (4) and the neck portion (10). Another purpose of the said plastic coating (22) is to ensure that the top and external portion of the neck portion (10) is not damaged during the crimping process.

It should be appreciated that the said collar (4) is preferably formed of material which is capable of withstanding high pressures, but at the same time soft enough to be bent into any desired shape. A malleable metal material, such as tins, aluminium or steel are examples of suitable materials.

Reference is made to FIG. 3 wherein is shown therein the neck portion (10) according to the present invention. Similar to the collar (4), the neck portion (10) could be divided into a number of sections. A first section (24) of the neck portion (10) includes a straight portion which is designed to absorb the force during the crimping process in which the dispensing valve mounting cup (5) is crimped to the collar (4) and wherein by doing so the plastic coating (22) on the internal portion of the collar (4) is squeezed against this first section (24) of the neck portion (10) to effectively seal the components in a fluid-tight manner. It should be noted that this first section (24) of the neck portion (10) is designed and configured to be the thickest section on the neck portion (10) so that it may withstand the force and pressure applied during the crimping process. The neck portion (10) further includes a second section (26) wherein this section is provided to act as a first seal between the collar (4) and the container when the collar (4) is attached to the container neck portion, in which during this process, the collar (4) is pressed down mechanically by a crimper.

The neck portion (10) further includes a third section (28) wherein this section is a ribbed section, including one or more 'crush ribs' to provide a second and further seal between the collar (4) and the container during the crimping process, similar, to the description of the second section (26) of neck portion (10). The neck portion (10) further includes a fourth section (30) which is designed and configured to hold and secure the collar (4) to the container during the crimping process. This is to further ensure that the collar (4) is not separated from the container at high pressures. The fifth section (32) of the neck portion (10) is designed and configured to provide similar effect as the fourth section (30). This section is provided to further enhance the capability of not allowing the collar (4) to be separated from the container at high pressures. Finally, the sixth section (34) of the neck portion (10) is provided for manufacturing purpose which is a standard feature in container manufacturing process as well as to engage a cap (not shown) to the container (1).

It will be appreciated that when the collar (4) is attached onto the neck portion (10), the plastic coating (22) which is provided on the internal portion of the sections (14, 16, 18, 20) of the collar (4) would be crimped to the sections (24, 26, 28, 30, 32) of the neck portion (10) thus creating a seal and to ensure that the collar (4) is not separated from the container at high pressure.

It will also be appreciated that the dispensing valve mounting cup (5) is also provided with a plastic coating (36) on its inner surface. Reference can be made to FIG. 4 wherein is shown therein the location where the plastic coating (36) is provided. The plastic coating (36) is provided on an inner surface of the mounting cup (5) to provide a seal between the mounting cup (5) and the collar (4).

Figure 5:
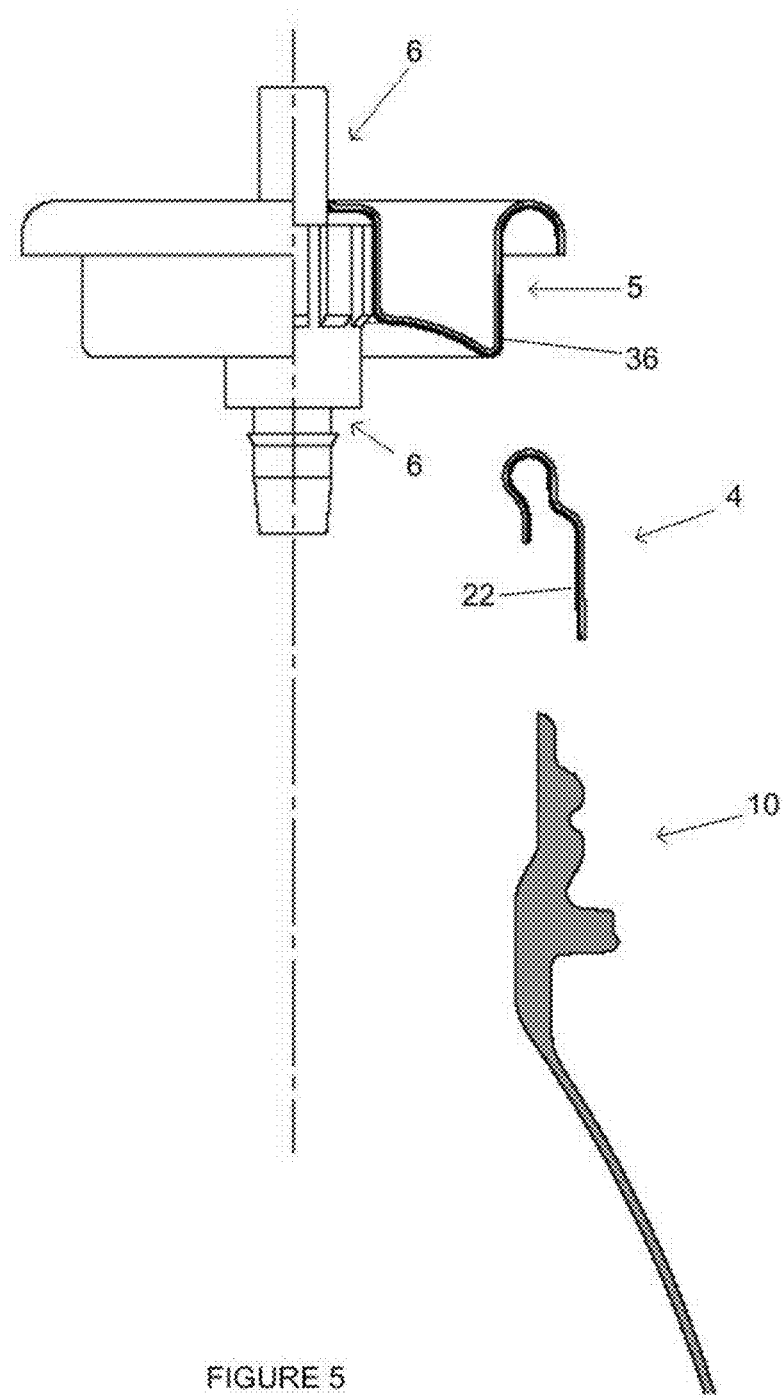
FIG. 5 shows an exploded cross-sectional view of the dispensing valve, mounting cup, collar and neck portion of the container.
Figure 6:
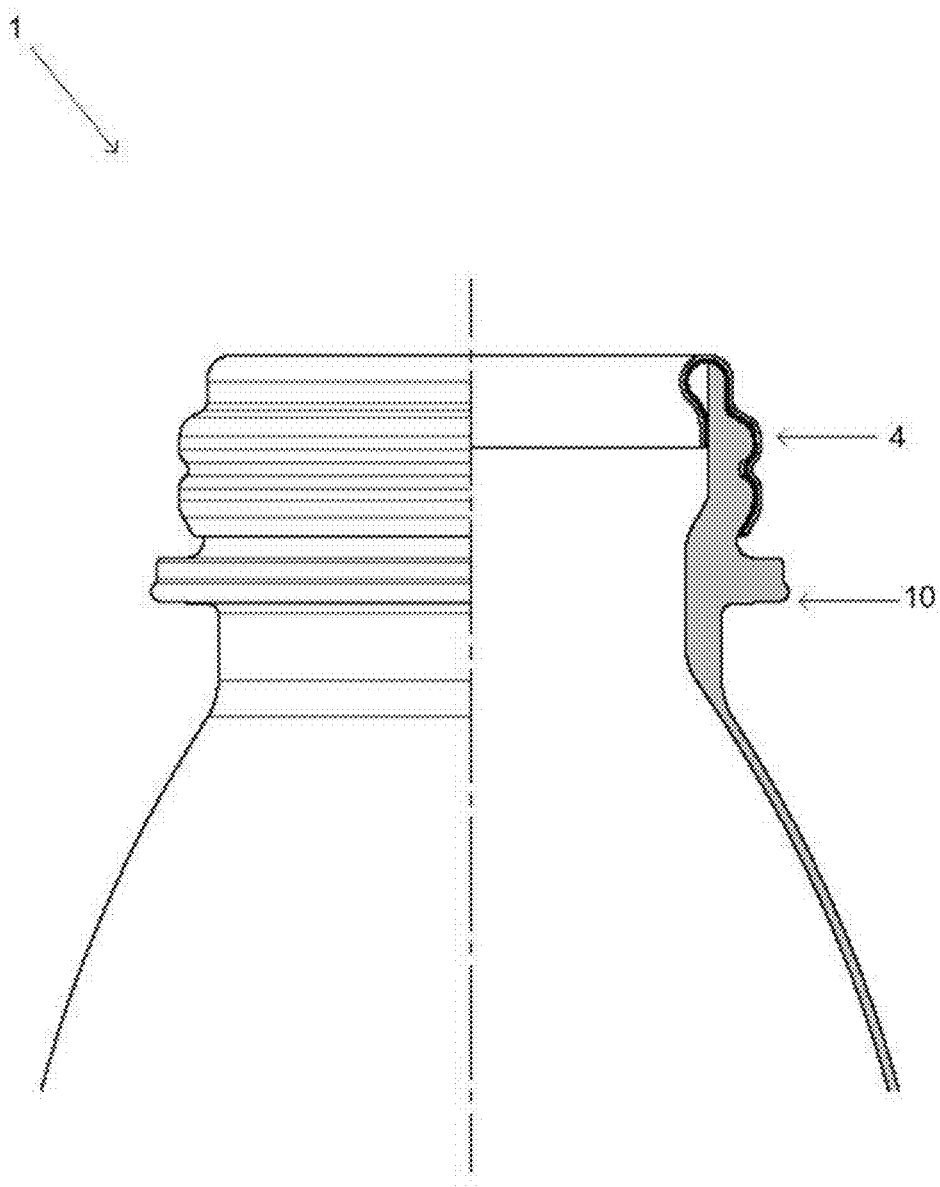
FIG. 6 shows a cross-sectional view of the collar assembled to the neck of the container.
Figure 7:
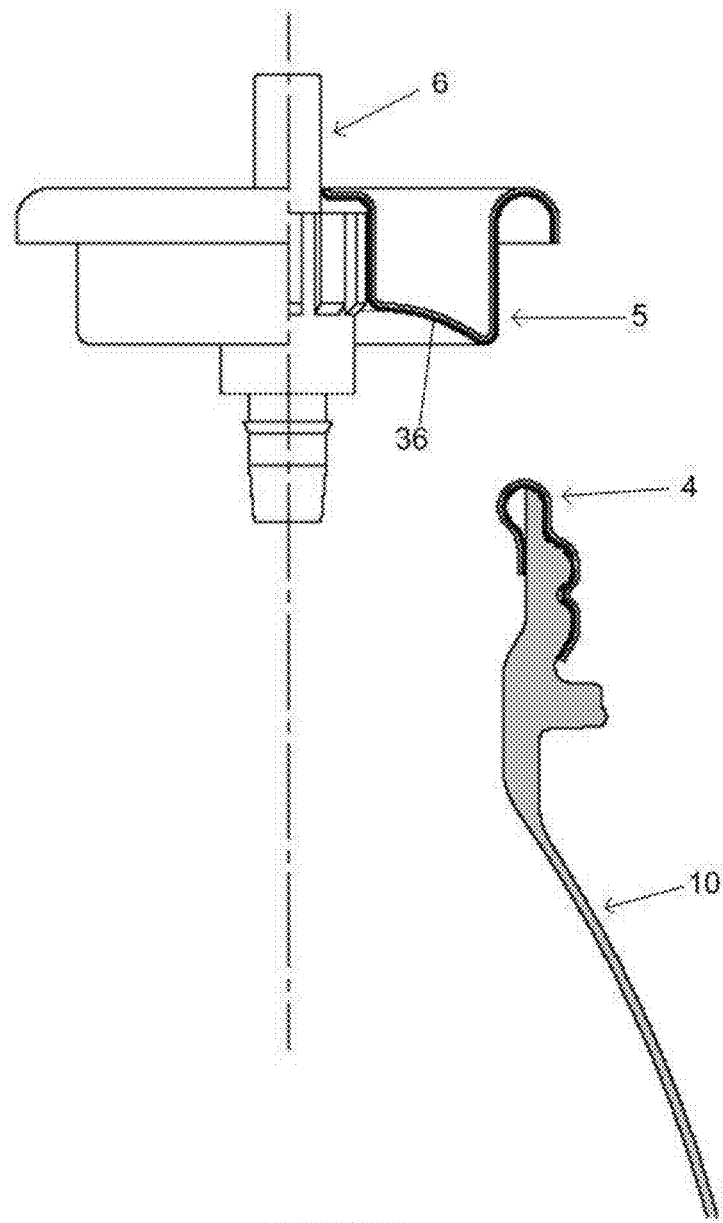
FIG. 7 shows an exploded view showing how the mounting cup and valve are attached to the collar fitted onto the neck portion of the container.
Figure 8:
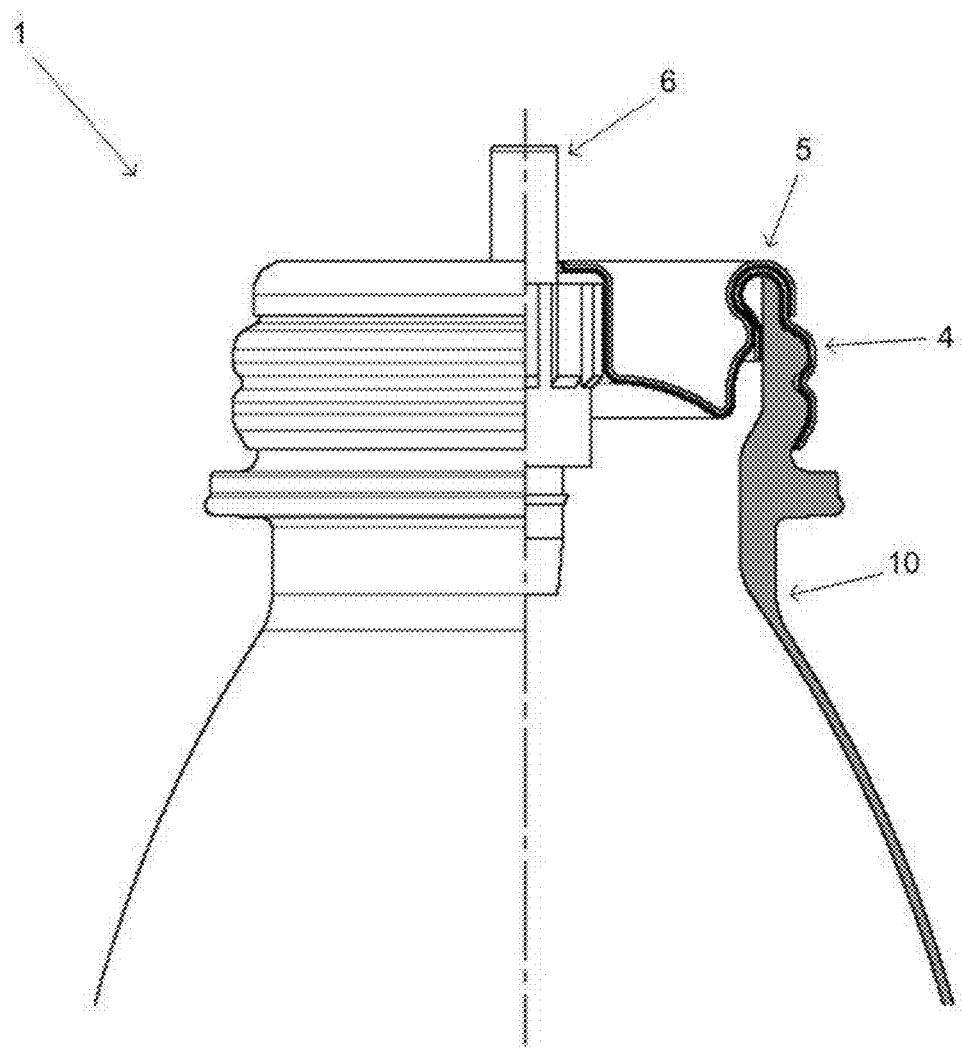
FIG. 8 shows a cross-sectional view of the components fitted and crimped to the container shown in FIG. 1.
Figure 9:
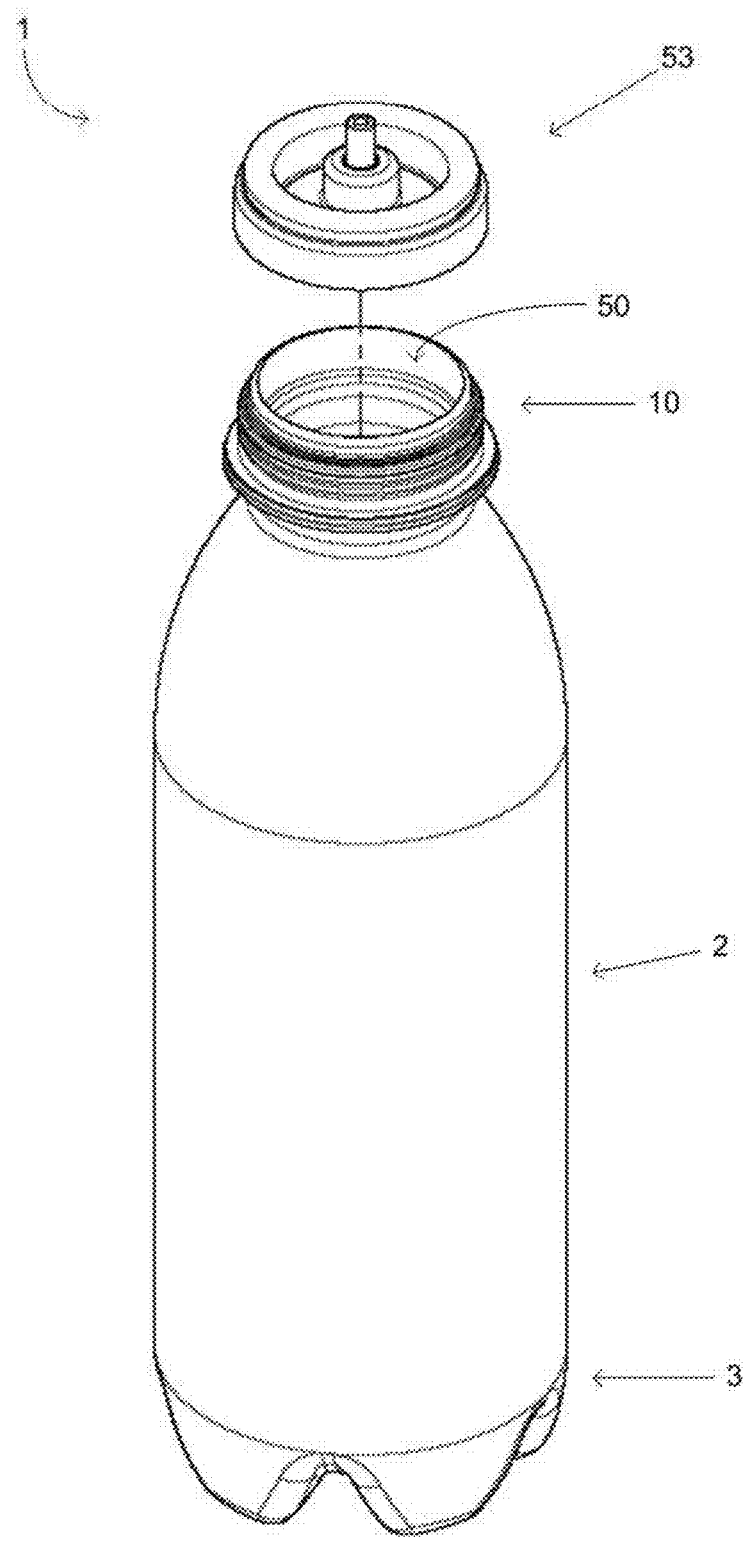
FIG. 9 shows an exploded perspective view of a container and the unitary collar and mounting cup assembly, in accordance with an alternatively preferred embodiment of the present invention.
Figure 10:
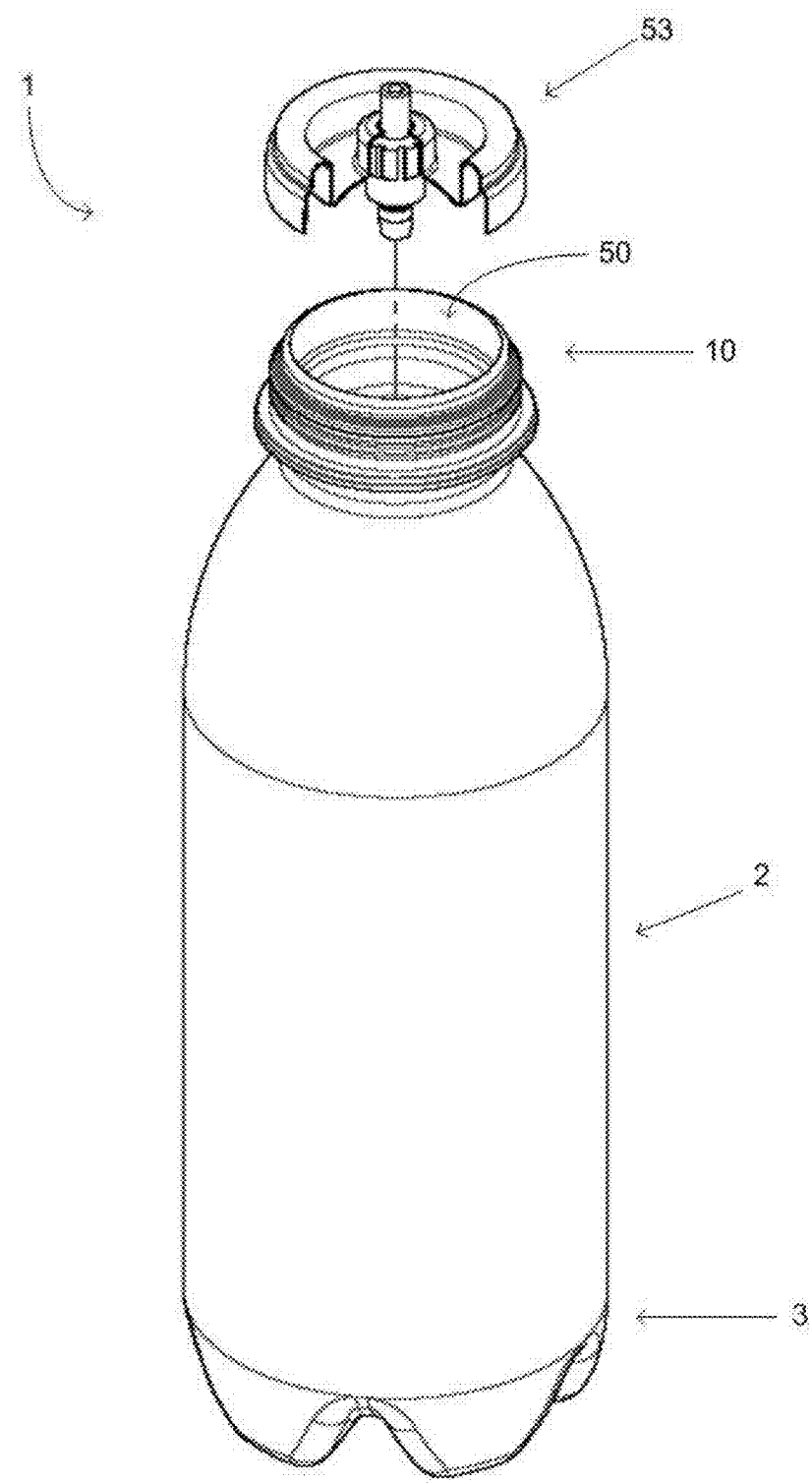
FIG. 10 shows an exploded perspective view of the embodiment of FIG. 9, but with the collar and mounting cup assembly partly cut away.

Reference is again made to FIGS. 5 to 8, which show how the various components may be assembled. Specifically, FIG. 5 shows the various components in exploded cross-sectional form, including the neck (10) of the container (1), the collar (4), the mounting cup (5) and the dispensing valve (6).

It will be understood that, in this embodiment, crimping is performed both externally and internally. This action will result in the section of the collar (4) as described earlier to be crimped onto the sections of the neck portion (10) as described earlier. The external crimping process would crimp the section (20) of the collar (4) to the sections (30 and 32) of the neck portion (10). The internal crimping process would crimp the dispensing valve mounting cup (5) against section (14) of the collar (4) and further crimping it against section (24) of the neck portion (10).

Once the dispensing valve mounting cup (5) is securely crimped to the collar (4) and the collar (4) is securely crimped to the neck portion (10), the container is now assembled.

It will be appreciated that, whilst particular embodiment has been hereinbefore described, variations and modifications may be made to the shape and configuration of the collar (4) and neck portion (10), whilst still achieving the advantages of the invention. All such variations and modifications should be considered to be within the scope of the invention as hereinbefore described.

It will be appreciated that the method and manufacture of the container is similar to that described in the Applicant's aforementioned application, with exception that the collar (4) is differently formed to achieve the advantages hereinbefore described.

As mentioned earlier, both the collar (4) and the dispensing valve mounting cup (5) is made of metal and therefore, in order to secure a good seal between two metal items, plastic coating (36) is provided therein. Similarly, plastic coating (22) is also provided as a seal between the collar (4) and the neck portion (10) of the container. Alternatively, other means of sealing could also be provided in order to provide the same effect as the plastic coating (22, 36). This could be selected from natural or synthetic materials.

The embodiment of the invention, as described in FIGS. 1 to 8, may be summarised as follows:

The container for dispensing a pressurized product includes a body portion (2), a collar (4), a mounting cup (5) and a dispensing valve (6) and wherein the body portion (2), includes a base (3) at a first end thereof, and a neck portion (10) at a second end thereof and wherein the neck portion (10) further includes one or more ribs (12) characterized in that wherein the collar (4) is divided into a first, second, third and fourth sections (14, 16, 18 and 20) wherein:

(i) the first section (14) of the collar (4) is designed specifically to fit a crimping process of the dispensing valve mounting cup (5) to the collar (4) and thereafter ensuring that the dispensing valve mounting cup (5) is not separated from the collar (4) when the container is in use;
  (ii) the second section (16) of the collar (4) is designed and configured to specifically fit the dispensing valve mounting cup (5);
  (iii) the third section (18) of the collar (4) is a section extended from the second section (16) towards a fourth section (20); and,
  (iv) the fourth section (20) of the collar (4) is an elongated section or skirt which extends beyond the length of the first section (14).
  and wherein the internal portion of the collar (4) is provided with a plastic coating (22) to create a seal between the collar (4) and the neck portion (10).

In this container, the neck portion (10) is divided into a first, second, third, fourth, fifth and six sections (24, 26, 28, 30, 32 and 34) and wherein:

(i) The first section (24) of the neck portion (10) includes a straight section which is designed to absorb the force during the crimping process in which the dispensing valve mounting cup (5) is crimped to the collar (4) and wherein the plastic coating (22) on the internal portion of the collar (4) is squeezed onto the first section (24) of the neck portion (10) to create a seal;
  (ii) the second section (26) is provided to act as a first seal between the collar (4) and the container when the collar (4) is attached to the container;
  (iii) the third section (28) is a ribbed section and is designed and configured to provide a second and third seal between the collar (4) and the container during the crimping process;
  (iv) the fourth section (30) is designed and configured to hold and secure the collar (4) to the container during the crimping process;
  (v) the fifth section (32) of the neck portion (10) is designed and configured to provide similar effect as the fourth section (30) to further enhance the capability of not allowing the collar (4) to be separated from the container at high pressures; and,
  (vi) the sixth section (34) of the neck portion (10) is provided for manufacturing purpose, as well as to engage a cap.

In this container, the collar (4) is attached onto the neck portion (10), the plastic coating (22) which is provided on the internal portion of the sections (14, 16, 18, 20) of the collar (4) would be crimped to the sections (24, 26, 28, 30, 32) of the neck portion (10) thus creating an ideal seal and to ensure that the collar (4) is not separated from the container at high pressure.

In this container, the dispensing valve mounting cup (5) is also provided with a plastic coating (36) at the internal portion of the dispensing valve mounting cup (5) as to provide a seal between the mounting cup (5) and the collar (4).

In this container, the crimping process is done both externally and internally onto the collar (4) and the neck portion (10).

In this container, the external crimping process would crimp the section (20) of the collar (4) to the sections (30 and 32) of the neck portion (10).

In this container, the internal crimping process would crimp the dispensing valve mounting cup (5) against section (14) of the collar (4) and further crimping it against section (24) of the neck portion (10).

In this container, natural or synthetic materials can be used to provide the same effect as the plastic coating (22, 36).

In another embodiment of the container, the collar (4), the mounting cup (5) and the dispensing valve (6) may be provided as a single piece and wherein section (16) of the collar (4) is tightly fitted or wedged onto the section (26) of the neck portion (10) therefore providing no gap between the section (16) of the collar (4) and the section (26) of the neck portion (10).

In this embodiment, the said collar (4) includes a hard enough material to withstand pressure but at the same time soft enough to be bent into any desired shape.

This alternative but also preferred embodiment of the present invention is illustrated in FIGS. 9 to 15. In this alternative embodiment of the invention, a single piece mounting cup and collar assembly is utilised in place of the separate collar and the mounting cup assembly shown in the earlier embodiments.

Figure 11:
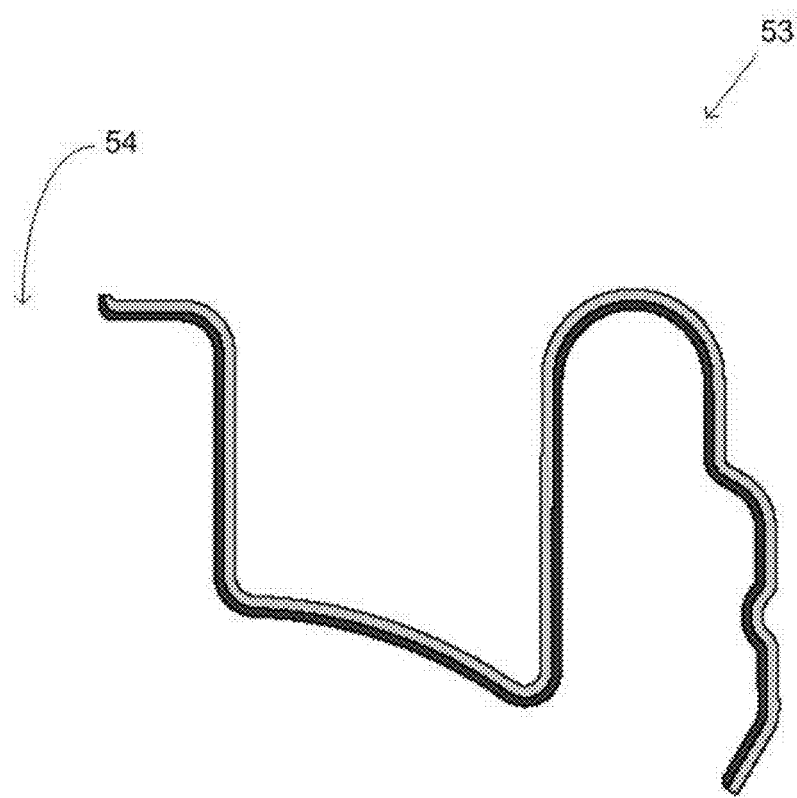
FIG. 11 illustrates a cross-sectional view of the single piece mounting cup and collar assembly component (after being shaped)

As shown in FIGS. 9 to 15, the container in accordance with this embodiment of the invention is similar to that of the embodiment of FIGS. 1 to 8, but using a single-piece collar and mounting cup assembly (53), as detailed in FIG. 11. A container (1) formed in accordance with this embodiment, includes a body (2) formed of plastics material such as PET. The body includes a neck (10) which defines an opening (50) of the container (1). The opening includes an internal wall (51), and, an external wall (52). A unitary mounting cup and collar assembly (53), the profile of which is shown in enlarged form in FIG. 11, straddles the internal and external walls (51 and 52) of the opening (50). The mounting cup and collar assembly (53) includes a central orifice (54) into which the valve stem (62) etc, (for dispensing the pressurised/aerosol product provided in the container) may be incorporated and secured thereto.

The mounting cup and collar assembly (53), such as illustrated in FIG. 11, is preferably formed of malleable material, such as tin, aluminium or other metal material. As will be recognised by a person skilled in the art, it should be preferably produced of material which does not interact with the contents of the container, etc., whilst being capable of being crimped for attachment to the container. It may preferably include a lining of plastic, PE, PP, or like material which may assist in minimising reaction with the contents, and, to also assist in sealing the components of the container, that is, to provide a seal between the assembly and the valve, and, between the assembly and the container as will be further described hereinafter.

Figure 12:
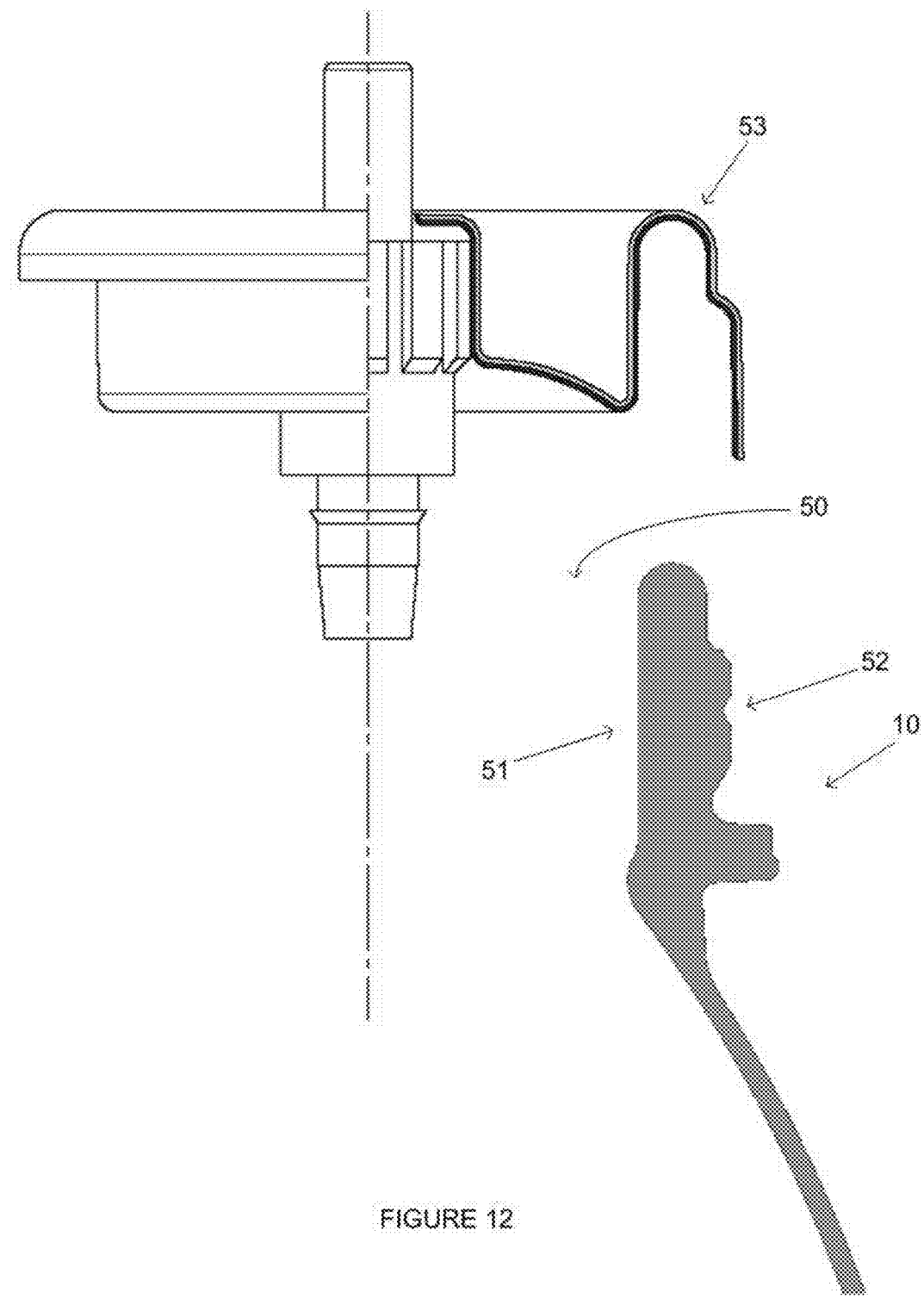
FIG. 12 shows an exploded cross-sectional view, showing how the assembly of FIG. 11 is attached to the neck of the container.
Figure 13:
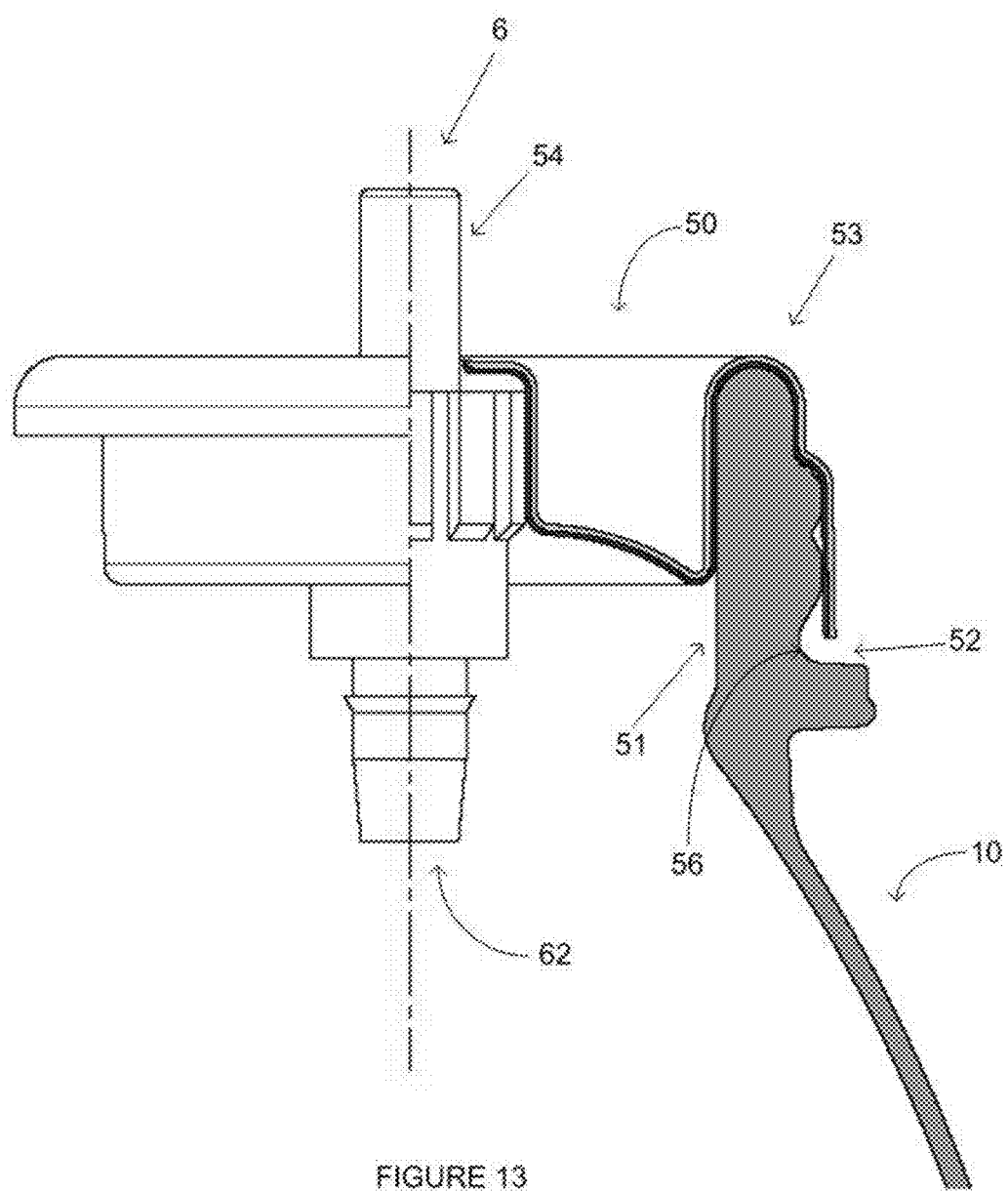
FIG. 13 shows the single piece mounting collar assembly installed on the neck of the container.
Figure 14:
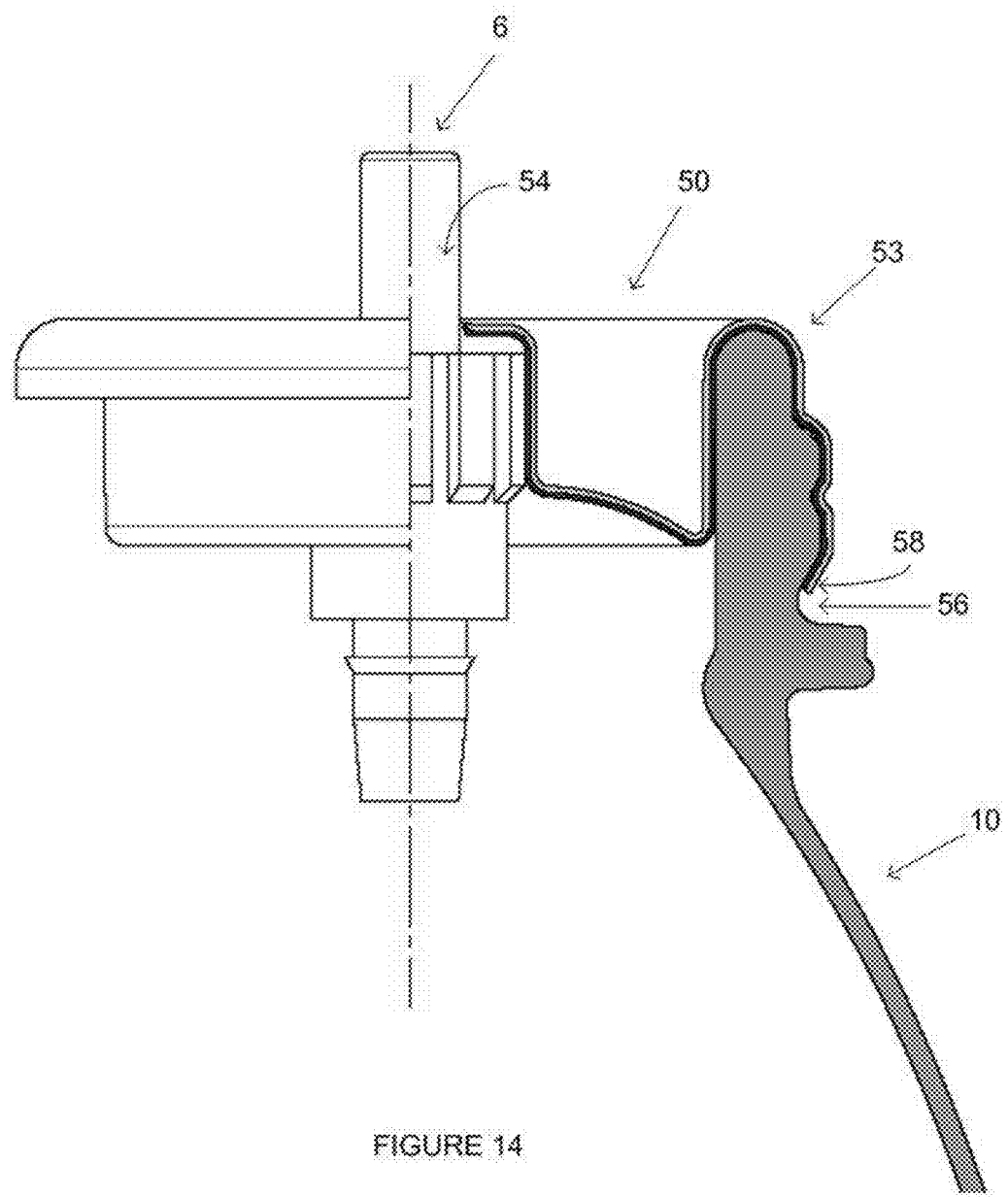
FIG. 14 illustrates the single piece mounting cup and collar assembly and dispensing valve of FIGS. 11 and 12 installed on and crimped to the container; and, FIG. 15 details an enlarged view of a portion of FIG. 14, showing the interactions between the mounting cup and collar assembly, and, the external wall of the neck of the container.
Figure 15:
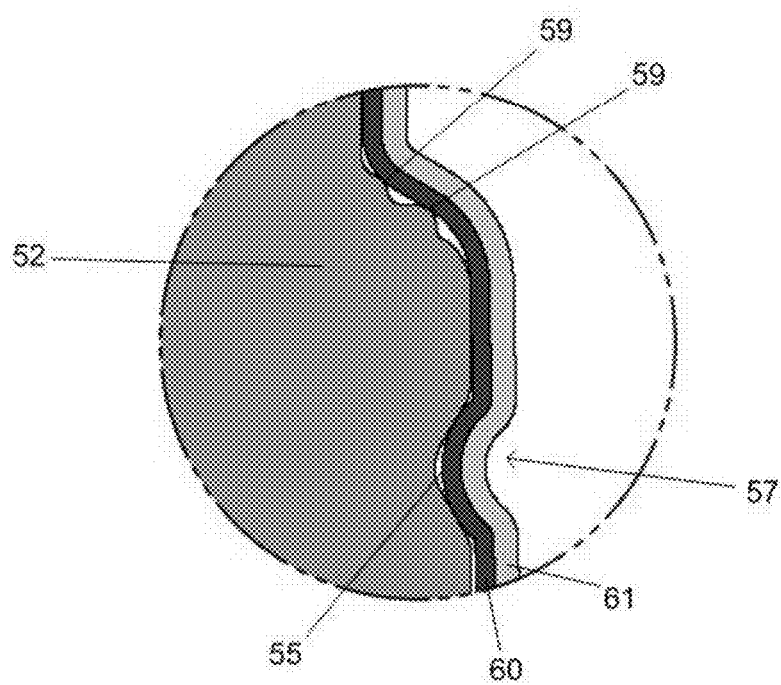

The mounting cup and collar assembly (53) is preferably shaped such that it may be easily inserted over the neck (10) of the container (1) and then be secured thereto, as shown in FIGS. 12 and 13. FIGS. 14 and 15 then show how the mounting cup and collar assembly (53) may be crimped to the external wall (52) of the neck (10) of the container (1). For this purpose, and as shown in enlarged form in FIG. 15, the external wall (52) preferably includes at least one groove (55) or undercut (56) for crimping of the assembly (53) therewith.

FIGS. 14 and 15 show a groove (55) formed in the neck (10) of the container (1). A region (57) is swaged around the periphery of the mounting cup and collar assembly (53) for securement of the mounting cup and collar assembly (53) to the external wall (52) of the neck (10) of the container (1). An end portion (58) of the mounting cup and collar assembly (53) is also preferably crimped or deformed inwardly as shown to engage a corresponding undercut (56) in the external wall (52) of the neck (10) of the container (1). This facilitates retention of the assembly (53) onto the neck (10), and also, operates to conceal the end (58) of the assembly (53) which may typically be sharp and be prone to cause injury.

As best illustrated in FIGS. 14 and 15, the external wall (52) of the neck (10) preferably further includes at least one crush rib (59) thereon, which provides improved sealing engagement with the assembly (53) by compressing the plastic, PE, or PP liner (60).

It will therefore be understood by persons skilled in the art that the present invention therefore provides a unique mounting cup and collar assembly (53), which is distinguished from the prior art in both form and function, particularly as it is produced in a single piece form. This single piece assembly (53) preferably incorporates a dual layer construction of metal (61) and liner (60) which assists in the sealing of the components of the container.

It will be appreciated by persons skilled in the art that by utilisation of this single piece mounting cup and collar assembly (53), manufacture of the overall container (1) is greatly simplified. In manufacture of the container in accordance with the present invention, it will be appreciated that the container body (1), or a preform therefor, may firstly be constructed to have a neck (10) defining an opening (50). The mounting cup and collar assembly (53) may then be attached over the neck (10) of the container or preform, such that it straddles the internal and external walls of the container. The mounting cup and collar assembly may then be secured to the assembly, by crimping it to the external wall of the neck. This is distinguished from the prior art whereby crimping a prior art mounting cup to a container is traditionally done to the internal wall of the container.

It will be appreciated by persons skilled in the art that the manufacture of the container in accordance with the present invention therefore avoids the necessity for any glues or sealants which has clear manufacturing advantages not only due to the elimination of the glues, etc. which in itself would save costs, but also, effectively eliminate additional manufacturing steps involved in applying the glues or adhesives or sealants.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

The invention claimed is:

1. A container for dispensing an aerosol product, including:
   a body, formed of plastics material, including a neck defining an opening having internal and external walls, said external wall including at least one groove, indentation or undercut therearound;
   a collar, formed of malleable material and including a plastic lining material on an inner surface thereof, said collar including a first portion which is shaped to straddle the internal and external walls of said opening, and a second portion in the form of a skirt which is adapted to extend therefrom and be secured to said external wall of said neck, by being externally crimped thereto to form at least one swaged ring to thereby engage with said groove, indentation or undercut around said external wall of said neck; and,
   a mounting cup, formed of malleable material and including a lining material on an inner surface thereof, said mounting cup including a first section for attachment to a dispensing valve, and a second section shaped to fit about and be secured to the first section of said collar by being internally crimped thereto.

2. The container of claim 1, wherein said body is formed of PET, and wherein each of said collar and mounting cup are formed of tin, aluminium or other metal and includes a lining of plastic, PE, or like material.

3. The container of claim 1, wherein an end portion of said skirt of said collar is crimped or shaped to engage a correspondingly shaped undercut in said external wall of said neck.

4. The container of claim 1, wherein said external wall of said neck further includes at least one crush rib which is adapted to provide a seal between said collar and said body.

5. A method of forming a container for dispensing an aerosol product, including the steps of:
   forming a container body, or preform, including a neck defining an opening, the neck including internal and external walls, said external wall including at least one groove, indentation or undercut therearound;
   inserting a collar over said neck such that it straddles internal and external walls of said opening, wherein said collar is formed of a malleable material and includes a plastic lining material on an inner surface thereof;
   securing said collar to the external wall of said neck, whereby at least one swaged ring on said collar is externally crimped about a correspondingly shaped groove or indentation provided in said external wall of said container;
   inserting a mounting cup over said collar, wherein said mounting cup is formed of malleable material and includes a lining material on an inner surface thereof; and,
   securing said mounting cup to said collar by being internally crimped thereto.

6. The method of forming a container of claim 5, wherein said body is formed of PET, and each of said mounting cup and said collar includes a lining of plastics, PE, PP, or like material.

7. The method of forming a container of claim 5, wherein, in said securing step, an end portion of said skirt of said collar is crimped or otherwise engaged with a correspondingly shaped undercut provided in said external wall of said neck.

8. The method of forming a container of claim 5, wherein, in said securing step, said collar is adapted to engage with at least one crush rib formed on said external wall.

9. The method of forming a container of claim 5, wherein when said preform is used in said forming step, said method further includes the step of stretch blowmoulding said preform to form said container.

10. A container for dispensing an aerosol product, comprising:
    a body, formed of plastics material, including a neck having an upper most portion and defining an opening having internal and external walls, said external wall including at least one groove, indentation or undercut therearound;
    a mounting cup and collar assembly, formed of malleable material, which is shaped to straddle the internal and external walls of said opening, and be secured to said external wall of said neck, wherein said assembly is adapted to be crimped to form at least one swaged ring to thereby engage with said groove, indentation or undercut around said external wall of said neck;
    a first seal between the mounting cup and collar assembly and the upper most portion of the neck; and
    a first crush rib on the external wall of the neck adapted to provide a second seal between the mounting cup and collar assembly and the external wall.

11. The container of claim 10, further comprising a second crush rib on the external wall of the neck adapted to provide a third seal between the mounting cup and collar assembly and the external wall.

* * * * *